July 12, 1938.   J. F. VAN LEUVEN   2,123,445
FILM DEVELOPING APPARATUS
Filed Sept. 7, 1937   3 Sheets-Sheet 1
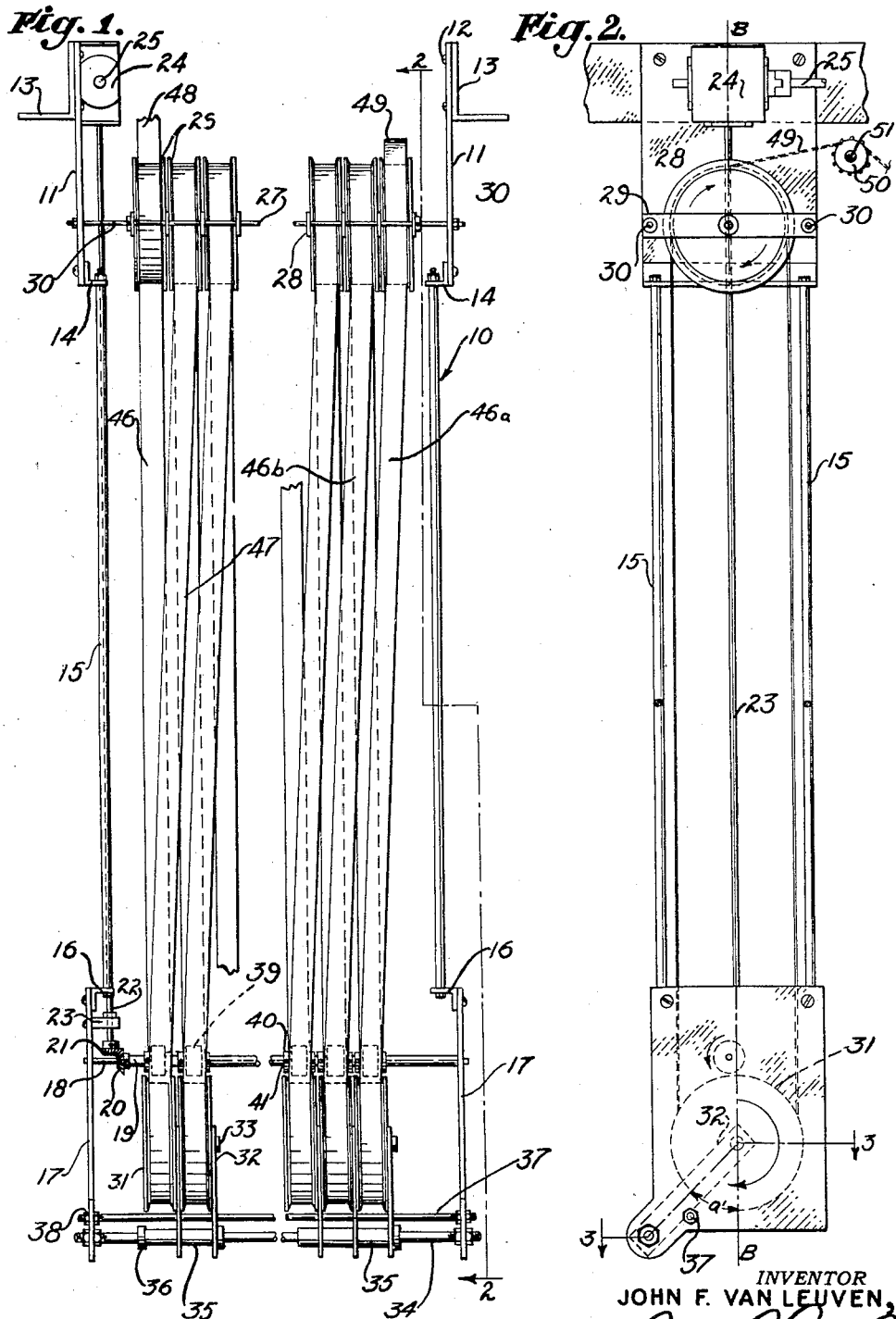
INVENTOR
JOHN F. VAN LEUVEN,
BY
ATTORNEY

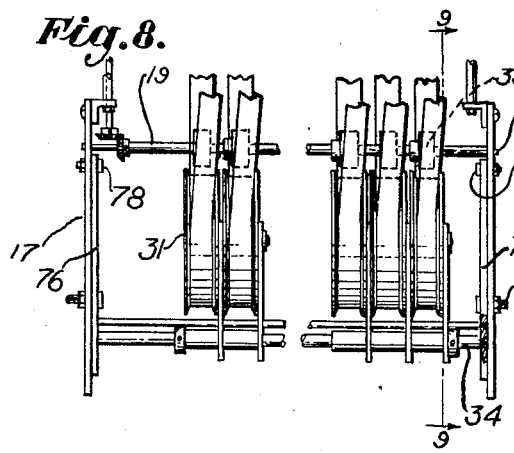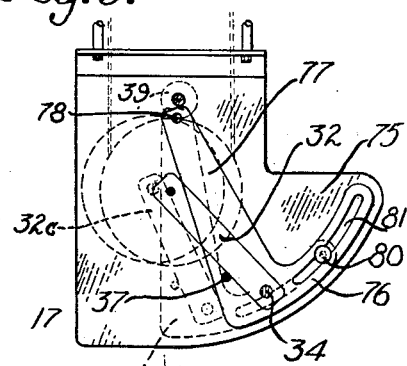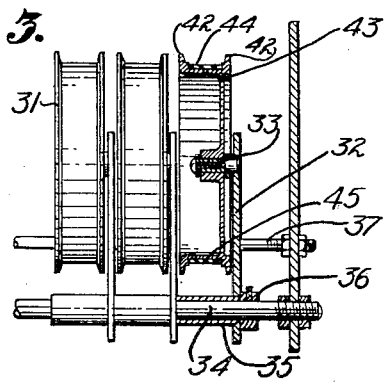

July 12, 1938.  J. F. VAN LEUVEN  2,123,445
FILM DEVELOPING APPARATUS
Filed Sept. 7, 1937  3 Sheets-Sheet 3
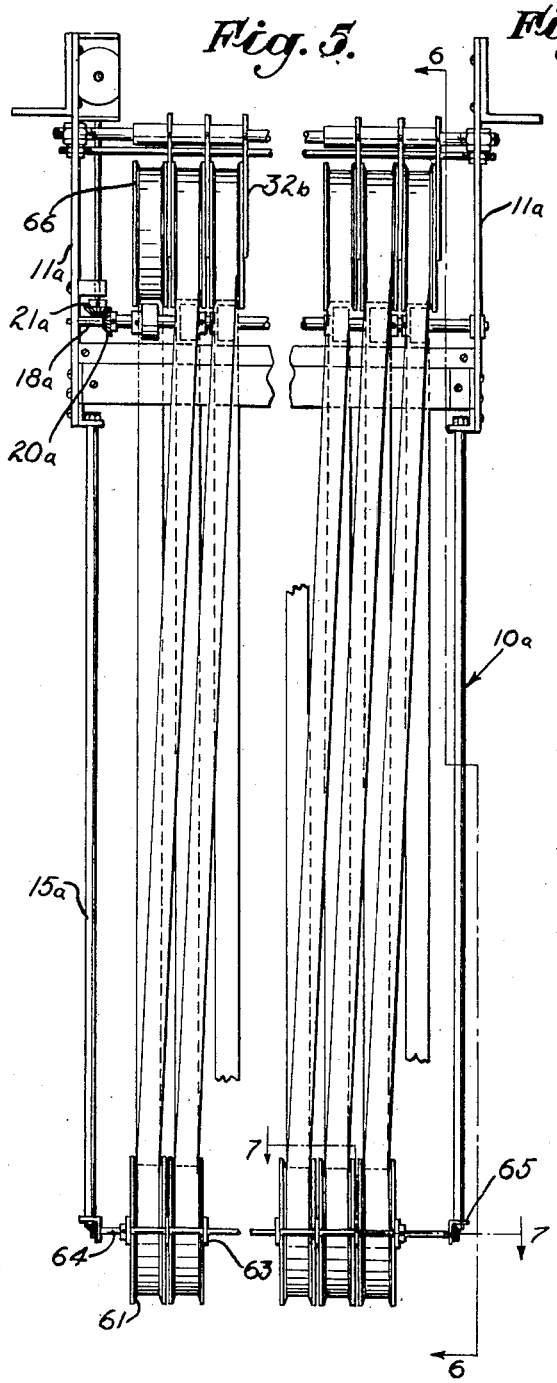
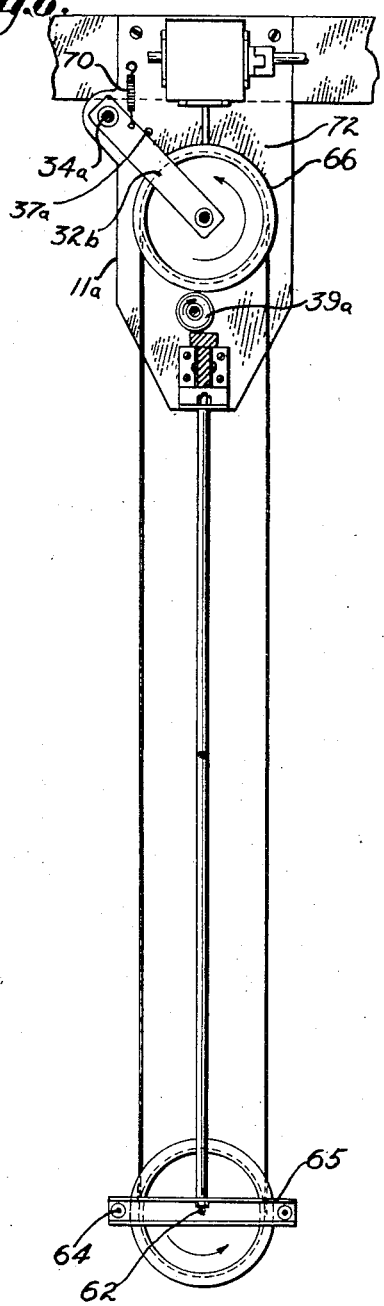
INVENTOR
JOHN F. VAN LEUVEN,
BY
ATTORNEY Patented July 12, 1938

2,123,445

UNITED STATES PATENT OFFICE 2,123,445

FILM DEVELOPING APPARATUS

John F. Van Leuven, Los Angeles, Calif.

Application September 7, 1937, Serial No. 162,637

15 Claims. (Cl. 271—2.3)

My invention relates to devices for handling motion picture film in the processing thereof, and relates in particular to a continuous motion picture film developing machine, and like equipment wherein the film being treated, or processed, is carried continuously through the treatment zones.

It is an object of my present invention to provide a device of simple form in which the film to be treated is carried through consecutive loops within a treating chamber, for example, a developing tank, fixing tank or dry box, which device may be continuously operated at relatively high speed without danger of injury to, or breakage of, the film due to excessive tension being placed therein while the same is traveling through the consecutive loops of the device. In this film handling device, forming my invention, the film is carried over consecutive rollers placed in such position that loops will be formed of the film. In devices of this general character it is necessary to make provision for the change in length of the film as it passes through different stages of a process. Contraction, or shortening, of the film presents a problem relative to injury or breakage of the film strip and any film handling device to be considered practical and foolproof must have provisions whereby the change in length of the film may be compensated for without placing of strain in the film sufficient to injure or rupture the same. In my present device the travel of the film through a treating zone, or chamber, is controlled by, or is in accordance with, the rate at which the film is taken from the outlet end of such zone, or chamber; accordingly, the film take-off, which may be any form of positive drive device, pulls the film from the last loop of the series of consecutive loops in the treatment zone, or chamber, and as this is done film is pulled from each consecutive preceding loop in the zone, or chamber. In order that the cumulative resistance of the consecutive loops of the film will not be concentrated at any one point of pull throughout the path of movement of the film, I provide individual drive means for each of the loops controlled by and in accordance with the shortening and elongation of the individual loops, so that when any loop shortens to a predetermined size one of the rollers supporting such loop will be driven to exert a pull on the film which will draw film from the preceding loop of film, in the film handling device.

It is an object of the invention to provide in a film handling device of the above character a drive roller in cooperative relation to a film spool, across which a film is run, this spool being supported by lever means so that the shortening of the film will move the spool into engagement with the drive roller, whereby the spool will be driven to exert a pull on the film to draw film from a preceding portion of the patent movement of the film. In the preferred form of my invention, disclosed hereinafter, the lever means is disposed at an acute angle relative to a line passing through the centers of the drive roller and spool. The lever means is likewise placed at such acute angle relative to the line of pull of the film, when the same shortens, that the effective lever arm dimension decreases as the spool moves toward and into engagement with the drive roller.

It is a further object of the invention to provide a simple form of film handling mechanism comprising a supporting frame which may be disposed in any film treatment chamber, and which has primary and secondary spools placed so as to define loops when the film is threaded thereover. The primary spools are preferably disposed on stationary bearings, and the secondary spools are supported by lever means of the general character described in the preceding paragraph. The spools are so placed as to define consecutive loops in side by side relation so that a drive shaft may be extended through these loops in positions adjacent the secondary spools so as to carry drive rollers which will be engaged by the secondary spools when the loops shorten, and as the result thereof move the secondary spools. The spools are preferably so placed that the loops formed by film carried thereover will be vertically elongated, and the movable spools, and the cooperative drive rollers, may be disposed either at the bottoms or tops of the loops, as desired. Where the movable spools are placed at the lower ends of the loops, the weight of the levers provides forces which tend to move the movable spools downwardly and, accordingly, away from the drive rollers. Where the movable spools are placed at the tops of the loops, means such as springs may be applied to the levers to move them in a direction to carry the spools upwardly and away from the cooperating drive rollers.

It is highly desirable that there be no slippage between the spool and the film, and it is an object of my invention to provide an apparatus for handling film in which slippage between the film and the film carrying spools is eliminated.

Further objects and advantages of the invention will be brought out in the following part of the specification.

Referring to the drawings, which are for illustrative purposes only,

Fig. 1 is a side elevation of a preferred form of my film handling device, this view being laterally condensed.

Fig. 2 is a sectional view, taken substantially as indicated by the line 2—2 of Fig. 1.

Fig. 3 is a sectional view, drawn to a large scale, and taken as indicated by the line 3—3 of Fig. 2.

Fig. 4 is a fragmentary side view showing a single secondary, or movable, spool supported by a diagonally disposed lever, and a cooperating drive roller, the purpose of this view being to show the movement of the spool into engagement with the drive roller when the shortening of the film loop moves such spool upwardly.

Fig. 5 is a side elevation, showing an alternative form of my invention wherein the secondary or movable spools are placed at the tops of the film loops.

Fig. 6 is a sectional view, taken as indicated by the line 6—6 of Fig. 5.

Fig. 7 is an enlarged fragmentary sectional view, taken substantially as indicated by the line 7—7 of Fig. 5.

Fig. 8 is an elevational view of the lower portion of the device, of the general character shown in Fig. 1, but in which device the spool supporting levers are adjustable into different angular positions.

Fig. 9 is a fragmentary section, taken substantially as indicated by the line 9—9 of Fig. 8, to show a spool-supporting lever and adjustment means therefor in elevation.

As shown in Figs. 1 and 2, the preferred form of my invention comprises a simple type of supporting frame 10, which is of such character that it may be easily handled and may be disposed in any of the various types of treatment chambers employed in the processing of motion picture film; for example, in a developing tank.

The frame 10 includes upper side plates 11, which are disposed in spaced relation and may be connected by means of screws 12 with supporting beams 13 disclosed as structural angles. Within the lower edge portion of each plate 11, a small angle 14 is secured, and from the ends of the angles 14 suspension bars 15 extend downwardly to the ends of angles 16, which are secured within the upper edges of the lower side plates 17, which are disposed in substantially the same spaced relation as the upper side plates 11. Extending between the plates 17, and having the ends thereof connected to such plates 17, there is a horizontal bar which serves as a bearing for a tubular shaft 19 adapted to be driven through use of a bevel gear 20, which is engaged by a bevel gear 21, secured to the lower end of a vertical shaft 22 which extends upwardly through a bearing 23, mounted on the adjacent plate 17 to a gear box 24, secured to the inner face of, and near the upper edge, one of the upper side plates 11. This gear box 24 contains suitable speed change gearing therein, adapted to be driven by a power shaft 25.

Between the upper plates 11 a plurality of film spools 26 are rotatably supported on a shaft, or bar 27, which extends from one plate 11 to the other plate 11. For convenience these upper spools 26 are referred to as primary film spools, and they may all individually rotate on the stationary axis defined by the rod 27, which is secured in place in such a manner that it does not rotate. The spools 26 may be held in a desired spaced relation by means of laterally disposed plates 28, which are of such length that the ends 29 thereof may engage horizontal rods 30 which extend from one plate 11 to the other in such a manner as to serve as supporting means for the extremities of the laterally extended plates 28.

Below the primary spools 26, and in cooperative relation thereto, are secondary film spools 31 carried on the upper ends of levers 32, by means of bearings 33 which project laterally from the upper end portions of the levers 32, as shown in Fig. 3. The levers 32 extend diagonally downwardly, and leftwardly, as shown in Fig. 2 and Fig. 4, to a pivot means disclosed in the form of a bar 34; the lower ends of the levers 32 are secured to sleeves 35 which surround the bar 34, as clearly shown in Fig. 3; the sleeves 35 are of such length as to give a desired spacing of the levers 32 and the secondary spools 31, when the sleeves 35 are assembled in end to end relation on the bar 34, the entire assembly of sleeves 35 being limited in movement on the bar 34 by adjustable collars 36.

The downward swinging movement of the levers 32 is limited by a stop having the form of a horizontal bar 37, which extends from one lower plate 17 to the other and has its ends secured to such plates by any simple means, such as nuts 38. In alignment with the secondary spools 31, drive rollers 39 are secured on the hollow shaft 19, these drive spools 39 having projecting collars 40 equipped with locking screws 41 so that the spools 39 may be readily adjusted to desired positions of cooperation with the secondary spools 31. The drive rollers 39 are of such width that they may pass between the flanges 42 of the secondary spools 31, to engage the bottom walls 43 of the film receiving channels 44, which are formed between adjacent flanges 42. The bottom walls of these channels are faced with rubber layers 45. From the schematic Fig. 4 it will be noted that when each secondary spool 31 is in its lowermost position, as shown in full lines, that is, when its supporting lever 32 is resting against the stop 37, the upper portion of such spool 31 will be spaced a short distance below the drive roller 39, which cooperates therewith. It will be noted that the lever 32, which supports each secondary roller 31, is disposed at an acute angle "a", to a line A—A which extends through the centers of the spool 31 and the cooperating roller 39. It will be likewise noted that each lever 32 extends downwardly and outwardly, or leftwardly, at an acute angle relative to a plane B—B, defined by the centers of the upper and lower rollers 26 and 31.

A motion picture film 46 is threaded over the spools in a manner to form consecutive vertically elongated film loops 47, the entering end of the film being at 48, and the departing or leaving end 49 of the film being carried out as shown, over the right-hand upper spool 26. The end 49 of the film may be carried over a pulling sprocket 50, associated with means for driving it at a controlled speed, such drive means including a shaft 51, Fig. 2. The action of the sprocket 50 pulls film from the end loop 46a, and this end loop 46a must pull or take film from the preceding loop 46b, etc. Should any loop 46 be shortened, the spool 31 which guides the lower end of such loop, for example the spool 31 of Fig. 4, will be pulled upwardly, and should the shortening of the loop continue, the spool 31 will be moved into the position shown by dotted lines 31a, in which position the associated drive roller 39 will be engaged. The drive roller is in constant rotation in anti-clockwise direction and imparts a clockwise driving force to the spool which engages it, with the result that that portion 52 of the film which leads down to the rightward side of the roller 31 will be pulled downwardly, thereby pulling film from the preceding loop of film. Should this pulling of film from a preceding loop of film cause such preceding loop to shorten to such an extent that the spool which guides the lower end thereof is brought into engagement with its associated drive spool 39, the pulling of film will be then transmitted to the next preceding film loop, and so on down the line from one loop to the other until the first, or leftward, loop 46 of the film is reached.

When each spool 31 is in its lowermost position, the line of pull of the associated film loop is in the direction of the broken line 55, and this line of pull 55 is spaced from the center of the pivot bar 34 at a distance X, Fig. 4, when the lever is swung upwardly into the position in which it is shown in dotted lines 32a, the line of pull of the film will move leftwardly into the position indicated by the line 56, which is disposed at a lever arm dimension "y", which is less than the dimension "x".

In the alternative form of my invention, shown in Figs. 5, 6 and 7, a frame 10a is provided which is of substantially the same construction as the frame 10 disclosed in Fig. 1. In this instance, primary film spools 61 are supported on a shaft 62, and are spaced by means of lateral plates 63, the ends of which are mounted on horizontal rods 64, carried by lateral angles 65 disposed at the lower ends of the suspension bars 15a of the frame 10a. In this form of the film handling device the movable or secondary film spools are supported on levers 32b, which extend downwardly and inwardly, or rightwardly, from a pivot 34a, which is extended between the upper plates 11a of the frame 10a. Each lever 32b is provided with a tension spring 70, exerting a force to swing the lever upwardly and move the associated secondary spool 66 away from the drive roller 39a, associated therewith, the upward movement of the levers 32b being limited by a stop bar 37a. The drive rollers 39a are mounted on a tubular shaft 19a, rotatably carried upon a bearing rod or bar 18a, and adapted to be driven through use of gears 20a, and 21a.

In this form of the invention, whenever a film loop 71 shortens beyond its normal size, the upper spool 66 associated therewith will be pulled downwardly into engagement with its associated drive roller 39a, so that such spool 66 will be positively driven and will cause film to be pulled from the next preceding film loop. In the same manner as explained relative to the operation of the device, disclosed in Figs. 1 and 2, the principles embodied in this alternative form of the invention are the same as those of the preferred form of the invention, for it will be noted that the levers 32b are disposed at acute angles relative to a plane defined by the loop 71, and likewise by the centers of the upper and lower spools 66 and 61. As illustrated in Fig. 6, each spool 66 travels along an arc 72 which is upwardly or outwardly displaced from the center of rotation of the associated drive roller 39a, which produces quite a different condition of engagement than where the arc of movement of the spool 66 passes through the center of the drive roller.

In Figs. 8 and 9 I show the lower portion of a film handling device of the general type disclosed in Figs. 1 and 2, but having adjustable means for carrying the pivot bar 34 so that said pivot bar may be moved laterally, and thereby change the angle of the levers 32 relative to a vertical plane defined by the centers of the upper and lower spools 26 and 31. In this construction the lower plates 17 are provided with an extension 75 so that segments 76 may be adjustably secured thereagainst. These segments 76 are placed against the inner faces of the plates 17 and each have a radial arm 77 of such length that the upper end thereof may swing on a pivot bolt 78, supported by the plate 17 in a position just below an end of the bearing rod 18 which carries the shaft 19 by which the drive rollers 39 are supported and driven. The ends of the pivot bar 34 are connected to the segments 76, in the manner shown, and the stop bar 37 likewise has its ends connected to the segments 76, so that as the segments 76 are swung on the pivots 78, both bars 34 and 37 will move through arcs, described, around the axis defined by the pivots 78. To lock the segments 76 in any desired position within the limits of their movement, locking bolts 80 are extended through arcuate slots 81, in such segments. With the segments in the position indicated by the segments 76, shown in full lines in Fig. 9, the levers 32 will be in the angular position disclosed in full lines. When the segments are moved into the position indicated by dotted lines 76a, the levers 32 will be moved into the position indicated by dotted lines 32c.

I claim as my invention:

1. In a motion picture film handling device of the character described, the combination of: a spool over which a film is carried in such relation that shortening of said film will exert a force to move said spool; a drive roller placed so as to be engaged by said spool when the shortening of said film moves the same; means for rotating said drive roller; a lever supporting said spool so that it may be moved by the shortening of said film into engagement with said drive roller; and pivot means supporting said lever so that it will lie at an acute angle to a line passing through the centers of said spool and said drive roller.

2. In a motion picture film handling device of the character described, the combination of: a spool over which a film is carried in such relation that shortening of said film will exert a force to move said spool; a drive roller placed so as to be engaged by said spool when the shortening of said film moves the same; means for rotating said drive roller; a lever supporting said spool so that it may be moved by the shortening of said film into engagement with said drive roller; and adjustable means carrying said pivot means, and enabling the movement of said pivot means so that the angular position of said lever relative to said line may be varied.

3. In a motion picture film handling device of the character described, the combination of: a spool over which a film is passed, the shortening of said film exerting on said spool a force tending to move the same along a line of movement; a drive roller placed in such position that it will be engaged by said spool when the same is moved along said line of movement by the shortening of said film; and lever means for supporting said spool, said lever means being so placed that the lever arm dimension thereof will decrease as said spool is moved toward said drive roller.

4. In a motion picture film handling device of the character described, wherein a loop of film defines a longitudinal center line, the combination of: a film spool on said center line and defining an end of said loop, said film running over said spool and exerting a force tending to move said spool forwardly as said film shortens; a drive roller placed within said end of said loop in a position to be engaged by said spool when it is moved by the shortening of said film; a supporting frame disposed along said center line; a pivot carried by said frame in a position to one side and rearwardly of the center of said spool; and a lever extending diagonally, forwardly and inwardly from said pivot to the center of said spool, there being bearing means on the forward end of said lever to carry said spool.

5. In a motion picture film handling device of the character described, wherein a loop of film defines a longitudinal center line, the combination of: a film spool on said center line and defining an end of said loop, said film running over said spool and exerting a force tending to move said spool forwardly as said film shortens; a drive roller placed within said end of said loop in a position to be engaged by said spool when it is moved by the shortening of said film; a supporting frame disposed along said center line; a pivot carried by said frame in a position to one side and rearwardly of the center of said spool; a lever extending diagonally, forwardly and inwardly from said pivot to the center of said spool, there being bearing means on the forward end of said lever to carry said spool; and stop means for limiting the rearward swinging movement of said lever and the rearward movement of said spool.

6. In a motion picture film handling device of the character described, wherein a loop of film defines a longitudinal center line, the combination of: a film spool on said center line and defining an end of said loop, said film running over said spool and exerting a force tending to move said spool forwardly as said film shortens; a drive roller placed within said end of said loop in a position to be engaged by said spool when it is moved by the shortening of said film; a supporting frame disposed along said center line; a pivot carried by said frame in a position to one side and rearwardly of the center of said spool; a lever extending diagonally, forwardly and inwardly from said pivot to the center of said spool, there being bearing means on the forward end of said lever to carry said spool; and means applying force to said lever to move the same in rearward direction.

7. In a motion picture film handling device of the character described, wherein a loop of film defines a longitudinal center line, the combination of: a film spool on said center line and defining an end of said loop, said film running over said spool and exerting a force tending to move said spool forwardly as said film shortens; a drive roller placed within said end of said loop in a position to be engaged by said spool when it is moved by the shortening of said film; a supporting frame disposed along said center line; a pivot carried by said frame in a position to one side and rearwardly of the center of said spool; a lever extending diagonally, forwardly and inwardly from said pivot to the center of said spool, there being bearing means on the forward end of said lever to carry said spool; stop means for limiting the rearward swinging movement of said lever and the rearward movement of said spool; and means applying force to said lever to move the same in rearward direction.

8. In a motion picture film handling device of the character described, wherein a loop of film defines a longitudinal center line, the combination of: a film spool on said center line and defining an end of said loop, said film running over said spool and exerting a force tending to move said spool forwardly as said film shortens; a drive roller placed within said end of said loop in a position to be engaged by said spool when it is moved by the shortening of said film; a supporting frame disposed along said center line; an adjusting member carried by said frame in proximity to said spool, said adjusting member having a pivot disposed rearwardly of said spool and in such position on said adjusting member as to be moved toward and away from said center line, as said adjusting member is moved; and a lever extending diagonally, forwardly and inwardly from said pivot to the center of said spool, there being bearing means on the forward end of said lever to carry said spool.

9. In a motion picture film handling device of the character described, wherein a loop of film defines a longitudinal center line, the combination of: a film spool on said center line and defining an end of said loop, said film running over said spool and exerting a force tending to move said spool forwardly as said film shortens; a drive roller placed within said end of said loop in a position to be engaged by said spool when it is moved by the shortening of said film; a supporting frame disposed along said center line; an adjusting member carried by said frame in proximity to said spool, said adjusting member having a pivot disposed rearwardly of said spool and in such position on said adjusting member as to be moved toward and away from said center line, as said adjusting member is moved; a lever extending diagonally, forwardly and inwardly from said pivot to the center of said spool, there being bearing means on the forward end of said lever to carry said spool; and stop means for limiting the rearward swinging movement of said lever and the rearward movement of said spool.

10. In a motion picture film handling device of the character described, wherein a loop of film defines a longitudinal center line, the combination of: a film spool on said center line and defining an end of said loop, said film running over said spool and exerting a force tending to move said spool forwardly as said film shortens; a drive roller placed within said end of said loop in a position to be engaged by said spool when it is moved by the shortening of said film; a supporting frame disposed along said center line; an adjusting member carried by said frame in proximity to said spool, said adjusting member having a pivot disposed rearwardly of said spool and in such position on said adjusting member as to be moved toward and away from said center line, as said adjusting member is moved; a lever extending diagonally, forwardly and inwardly from said pivot to the center of said spool, there being bearing means on the forward end of said lever to carry said spool; and means applying force to said lever to move the same in rearward direction.

11. In a motion picture film handling device of the character described, the combination of: a supporting frame; a plurality of primary film spools at one end of said frame; a plurality of secondary film spools at the other end of said frame, said spools being so positioned that a film may be threaded thereover to form consecutive loops; stationary bearing means carried by said frame to support said primary spools; a plurality of drive rollers; a shaft for carrying and driving said rollers, said shaft being supported by said frame in such position that said rollers will be disposed in said loops adjacent said secondary spools; a bar carried by said frame in substantially parallel relation to said shaft, and in a plane which is transverse to the plane defined by said loops, and which plane lies outside said loops; and a plurality of levers pivoted on said bar, said levers having bearings thereon for supporting said secondary spools and said bar being so placed that said levers extend diagonally therefrom to the centers of the respective secondary spools and swing on said bar as the shortening of said film loops move said secondary spools toward said drive rollers.

12. In a motion picture film handling device of the character described, the combination of: a supporting frame; a plurality of primary film spools at one end of said frame; a plurality of secondary film spools at the other end of said frame, said spools being so positioned that a film may be threaded thereover to form consecutive loops; stationary bearing means carried by said frame to support said primary spools; a plurality of drive rollers; a shaft for carrying and driving said rollers, said shaft being supported by said frame in such position that said rollers will be disposed in said loops adjacent said secondary spools; a bar carried by said frame in substantially parallel relation to said shaft, and in a plane which is transverse to the plane defined by said loops, and which plane lies outside said loops; a plurality of levers pivoted on said bar, said levers having bearings thereon for supporting said secondary spools and said bar being so placed that said levers extend diagonally therefrom to the centers of the respective secondary spools and swing on said bar as the shortening of said film loops move said secondary spools toward said drive rollers; and a stop bar carried by said frame in a position substantially parallel to said shaft, to limit the outward swinging movement of said levers when said spools are permitted by said film loops to move away from said drive rollers.

13. In a motion picture film handling device of the character described, the combination of: a supporting frame; a plurality of primary film spools at one end of said frame; a plurality of secondary film spools at the other end of said frame, said spools being so positioned that a film may be threaded thereover to form consecutive loops; stationary bearing means carried by said frame to support said primary spools; means for driving said shaft at such speed that the peripheral speed of said drive rollers will be at least as great as the speed at which said film is drawn from said film handling device; a plurality of drive rollers; a shaft for carrying and driving said rollers, said shaft being supported by said frame in such position that said rollers will be disposed in said loops adjacent said secondary spools; a bar carried by said frame in substantially parallel relation to said shaft, and in a plane which is transverse to the plane defined by said loops, and which plane lies outside said loops; and a plurality of levers pivoted on said bar, said levers having bearings thereon for supporting said secondary spools and said bar being so placed that said levers extend diagonally therefrom to the centers of the respective secondary spools and swing on said bar as the shortening of said film loops move said secondary spools toward said drive rollers.

14. In a motion picture film handling device of the character described, the combination of: a supporting frame; a plurality of primary film spools at one end of said frame; a plurality of secondary film spools at the other end of said frame, said spools being so positioned that a film may be threaded thereover to form consecutive loops; stationary bearing means carried by said frame to support said primary spools; a plurality of drive rollers; a shaft for carrying and driving said rollers, said shaft being supported by said frame in such position that said rollers will be disposed in said loops adjacent said secondary spools; a bar carried by said frame in substantially parallel relation to said shaft, and in a plane which is transverse to the plane defined by said loops, and which plane lies outside said loops; a plurality of levers pivoted on said bar, said levers having bearings thereon for supporting said secondary spools and said bar being so placed that said levers extend diagonally therefrom to the centers of the respective secondary spools and swing on said bar as the shortening of said film loops move said secondary spools toward said drive rollers; a stop bar carried by said frame, in a position substantially parallel to said shaft, to limit the outward swinging movement of said levers when said spools are permitted by said film loops to move away from said drive rollers; and spring means connected to said levers so as to move said secondary spools in a direction away from said drive rollers.

15. In a motion picture film handling device of the character described, the combination of: a supporting frame; a plurality of secondary film spools at the other end of said frame, said spools being so positioned that a film may be threaded thereover to form consecutive loops; stationary bearing means carried by said frame to support said primary spools; means for driving said shaft at such speed that the peripheral speed of said drive rollers will be at least as great as the speed at which said film is drawn from said film handling device; a plurality of drive rollers; a shaft for carrying and driving said rollers, said shaft being supported by said frame in such position that said rollers will be disposed in said loops adjacent said secondary spools; a bar carried by said frame in substantially parallel relation to said shaft, and in a plane which is transverse to the plane defined by said loops, and which plane lies outside said loops; a plurality of levers pivoted on said bar, said levers having bearings thereon for supporting said secondary spools and said bar being so placed that said levers extend diagonally therefrom to the centers of the respective secondary spools and swing on said bar as the shortening of said film loops move said secondary spools toward said drive rollers; spring means connected to said levers so as to move said levers in a direction to carry said secondary spools away from said drive rollers; and a stop bar carried by said frame in a position substantially parallel to said shaft to limit the outward swinging movement of said levers when said secondary spools are permitted by said film loops to move away from said drive rollers.

JOHN F. VAN LEUVEN.